(12) United States Patent
Shinde (10) Patent No.: US 9,939,288 B2
(45) Date of Patent: Apr. 10, 2018

(54) FUEL PUMP AVAILABILITY SYSTEM (71) Applicant: Accenture Global Services Limited, Dublin (IE)

(72) Inventor: Suraj Shinde, Metepec (MX)

(73) Assignee: Accenture Global Services Limited, Dublin (IE)

( * ) Notice: Subject to any disclaimer, the term of this patent is extended or adjusted under 35 U.S.C. 154(b) by 137 days.

(21) Appl. No.: 14/886,589

(22) Filed: Oct. 19, 2015

(65) Prior Publication Data

US 2017/0108344 A1    Apr. 20, 2017

(51) Int. Cl.
| | |
|---|---|
| *G01C 21/00* | (2006.01) |
| *G01C 21/36* | (2006.01) |
| *G06Q 20/32* | (2012.01) |
| *G06Q 10/02* | (2012.01) |
| *G07F 13/02* | (2006.01) |
| *G01C 21/34* | (2006.01) |
| *G06F 17/00* | (2006.01) |

(52) U.S. Cl.
CPC ..... *G01C 21/3697* (2013.01); *G01C 21/3476* (2013.01); *G01C 21/3679* (2013.01); *G06Q 10/02* (2013.01); *G06Q 20/322* (2013.01); *G07F 13/025* (2013.01)

(58) Field of Classification Search
CPC .. G01C 21/3476; G06Q 20/322; G06Q 10/02; G07F 13/025
USPC .......................................... 701/426; 700/237
See application file for complete search history.

(56) References Cited

U.S. PATENT DOCUMENTS

| | | | |
|---|---|---|---|
| 2014/0207277 A1* | 7/2014 | Broome | ................. G06Q 20/32 700/237 |
| 2015/0168172 A1* | 6/2015 | Roth | .................. G01C 21/3476 701/123 |

* cited by examiner

*Primary Examiner* — Mahmoud S Ismail
(74) *Attorney, Agent, or Firm* — Harrity & Harrity, LLP (57) ABSTRACT

A device may receive a request to identify one or more available fuel pumps. The device may determine selection parameters associated with identifying the one or more available fuel pumps. The selection parameters may include criteria used to identify whether a particular fuel pump is an available fuel pump. The device may receive pump information associated with a group of fuel pumps. The pump information may include information indicating whether each fuel pump, of the group of fuel pumps, is available. The device may identify, based on the selection parameters and the pump information, the one or more available fuel pumps. The device may provide, for display, information associated with the one or more available fuel pumps.

20 Claims, 8 Drawing Sheets

FUEL PUMP AVAILABILITY SYSTEM

BACKGROUND

A fuel station may include one or more fuel pumps associated with dispensing fuel. The fuel station may be a self-service fuel station (e.g., where a driver operates a fuel pump for dispensing of fuel) or a full-service fuel station (e.g., where an employee of the fuel station operates a fuel pump for dispensing of fuel).

SUMMARY

According to some possible implementations, a method may comprise: receiving, by a device, a request to identify an available fuel pump; determining, by the device, selection parameters associated with identifying an available fuel pump, where the selection parameters may include criteria used to identify whether a particular fuel pump is an available fuel pump; determining, by the device, pump information associated with a set of fuel pumps, where the pump information including information indicating whether each fuel pump, of the set of fuel pumps, is available; identifying, by the device and based on the selection parameters and the pump information, a fuel pump, of the set of fuel pumps, as an available fuel pump; and providing, by the device, information associated with the fuel pump identified as an available fuel pump.

According to some possible implementations, a device may comprise one or more processors to: receive a request to identify one or more available fuel pumps; determine selection parameters associated with identifying the one or more available fuel pumps, where the selection parameters may include criteria used to identify whether a particular fuel pump is an available fuel pump; receive pump information associated with a group of fuel pumps, where the pump information including information indicating whether each fuel pump, of the group of fuel pumps, is available; identify, based on the selection parameters and the pump information, the one or more available fuel pumps; and provide, for display, information associated with the one or more available fuel pumps.

According to some possible implementations, a non-transitory computer-readable medium may store instructions that, when executed by one or more processors, cause the one or more processors to: receive selection parameters associated with identifying an available fuel pump, where the selection parameters may include criteria used to identify whether a particular fuel pump is an available fuel pump; determine pump information associated with a group of fuel pumps, where the pump information may include information indicating whether each fuel pump, of the group of fuel pumps, is available; identify, based on the selection parameters and the pump information, the available fuel pump; and provide, for display by a user device, information associated with the available fuel pump.

DETAILED DESCRIPTION

The following detailed description of example implementations refers to the accompanying drawings. The same reference numbers in different drawings may identify the same or similar elements.

A user of a user device may wish to purchase fuel from a fuel station. For example, the user may be driving a vehicle, and the user may wish to fill the vehicle with fuel (e.g., when the vehicle is low on fuel). Even if locations of fuel stations may be readily available and/or known to the user, the user may not know whether the fuel pumps of the fuel stations are in-use, not in-use, out-of-service, or the like, without first travelling to the fuel station.

Implementations, described herein, may allow a server device to identify an available fuel pump, and provide information associated with the available fuel pump (e.g., for viewing by a user). In some implementations, the server device may identify the available fuel pump based on selection parameters, associated with a user device and/or a user of the user device, such that the user may customize the manner in which the available fuel pump is identified.

Figure 1A:
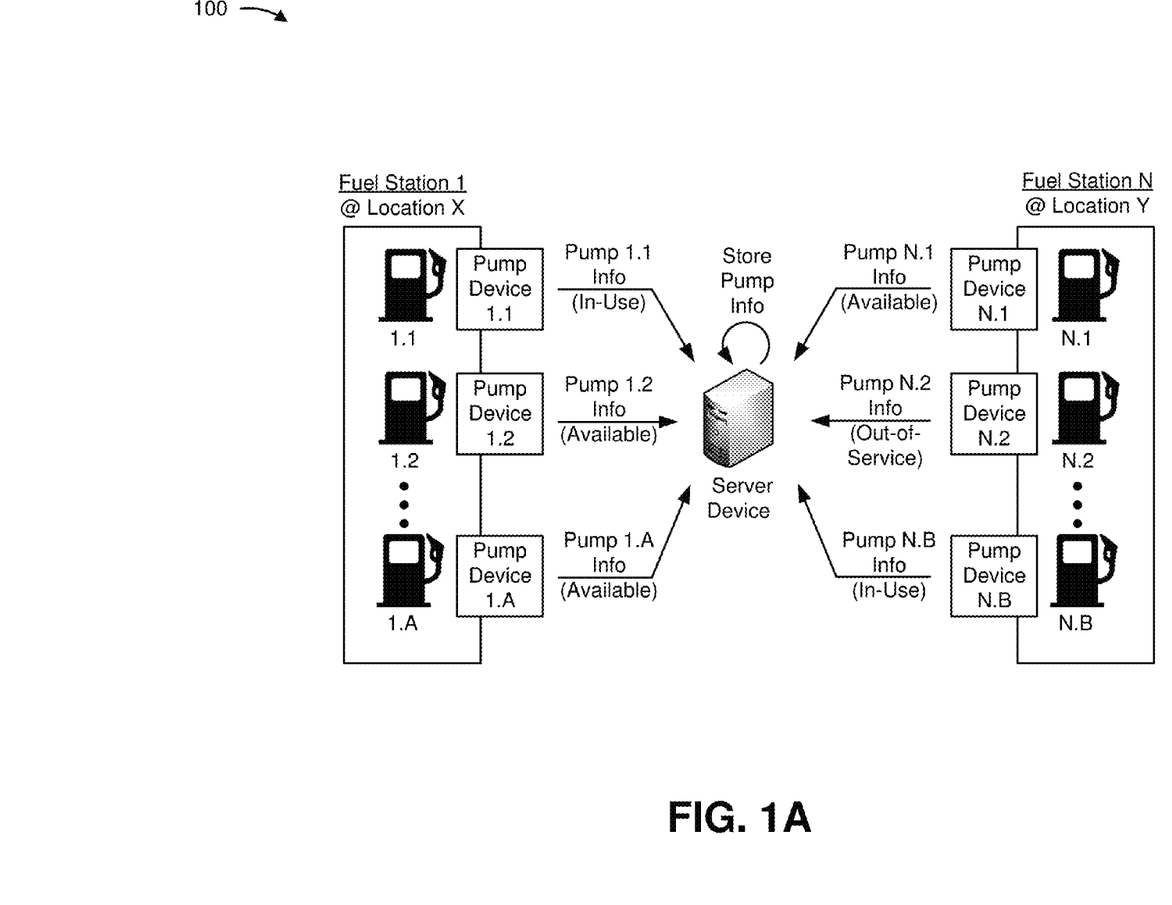
FIGS. 1A-1C are diagrams of an overview of an example implementation described herein.
Figure 1B:
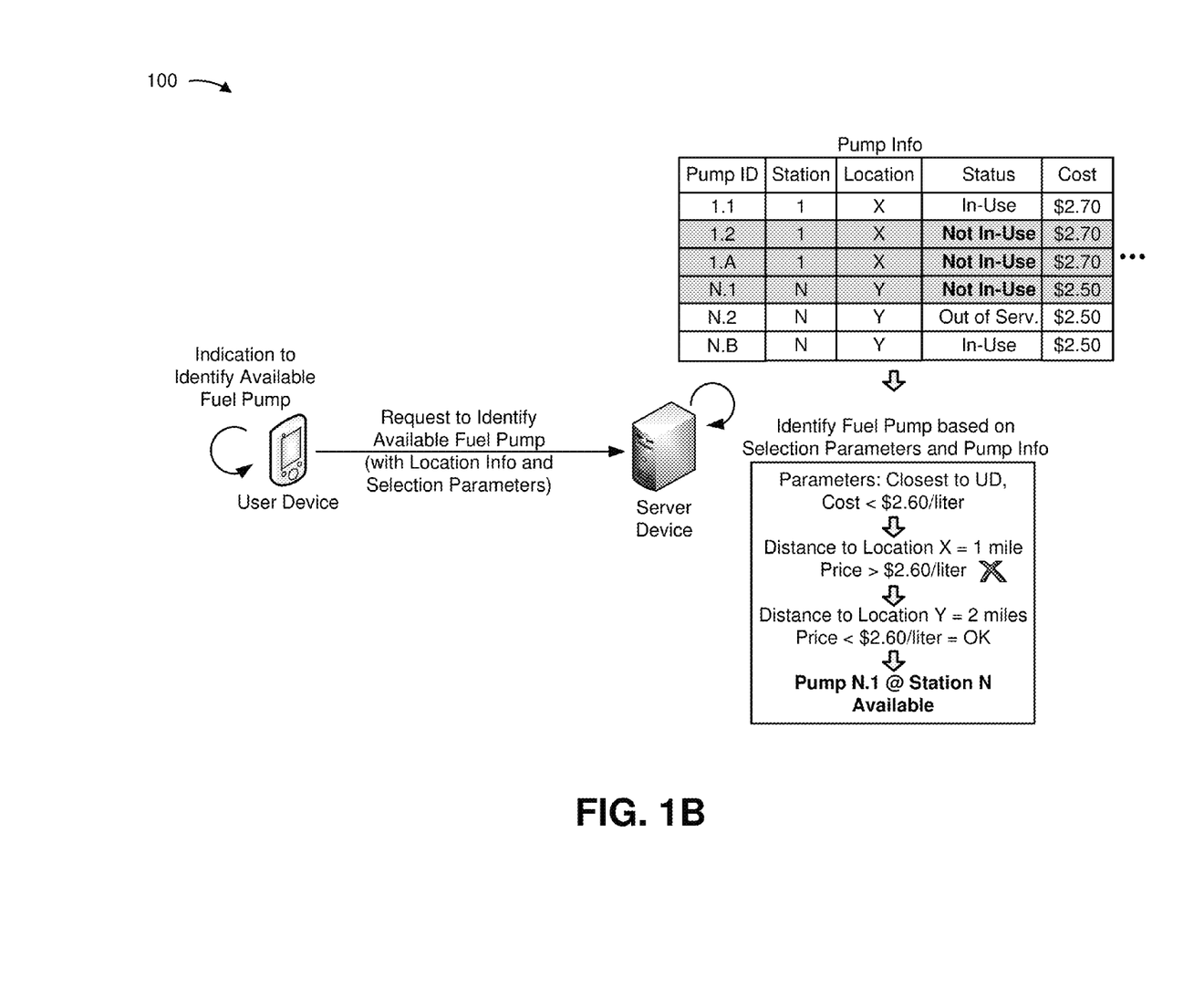
Figure 1C:
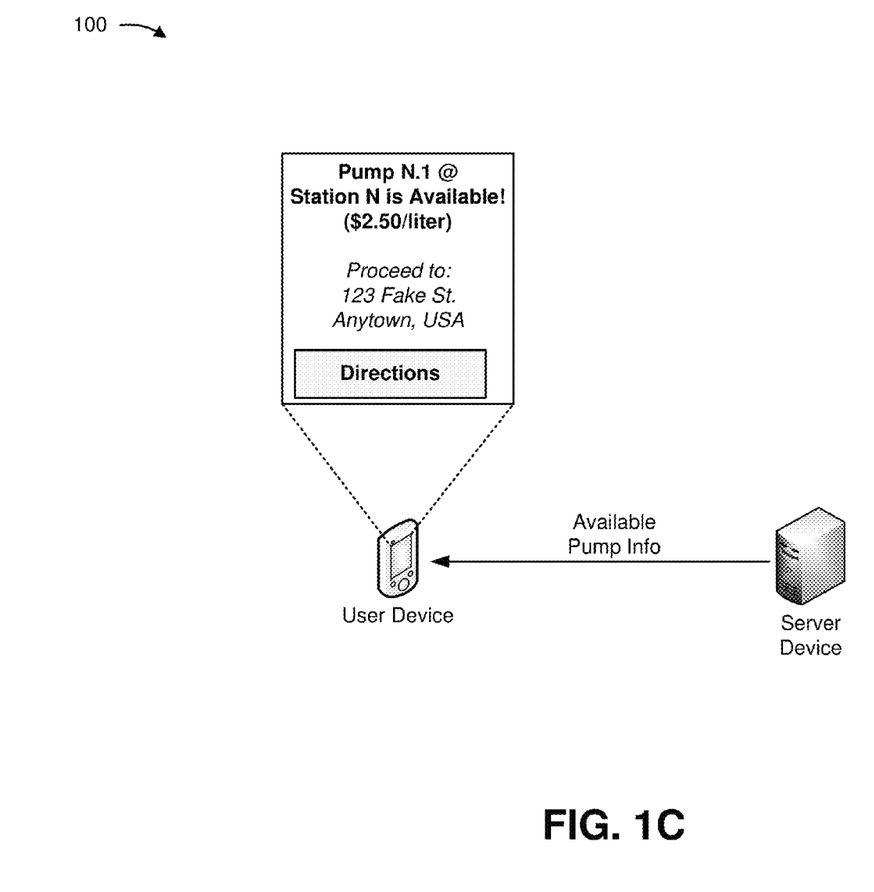

FIGS. 1A-1C are diagrams of an overview of an example implementation 100 described herein. For the purposes of example implementation 100, assume that a group of fuel stations (e.g., fuel station 1 through fuel station N) includes a corresponding set of fuel pumps (e.g., fuel pumps 1.1 through 1.A at fuel station 1, fuel pumps N.1 through N.B at fuel station N, etc.). In this example, each fuel pump is associated with a pump device (e.g., pump devices 1.1 through 1.A for fuel pumps 1.1 through 1.A, pump devices N.1 through N.B for fuel pumps N.1 through N.B, etc.) capable of determining pump information associated with a fuel pump. In other examples, two or more fuel pumps may be associated with a single pump device.

The pump information may include information indicating whether the fuel pump, corresponding to the pump device, is in-use, out-of-service, or the like. Additionally, or alternatively, the pump information may include information associated with the fuel pump, such as information that identifies the fuel pump, a price of the fuel dispensed at the fuel pump, a type of fuel dispensed at the fuel pump, or the like. Additionally, or alternatively, the pump information may include information associated with the fuel station, such as information that identifies the fuel station, information that identifies a location of the fuel station, or the like. In some implementations, the pump device may include a machine-to-machine (M2M) device (e.g., a camera, a sensor, etc.), a user device (e.g., a smart phone, a tablet, etc.), a server, or the like.

As shown in FIG. 1A, each pump device may, after determining the pump information, provide corresponding pump information to a server device. The server device may be capable of identifying one or more of available fuel pumps, and providing information associated with the one or more available fuel pumps to a user device, as described below. As shown in FIG. 1A, the pump information may include the information indicating whether the fuel pump is in-use, out-of-service, or the like. For example, the pump information for fuel pump 1.1 may indicate that fuel pump 1.1 is in-use, the pump information for fuel pump 1.2 may indicate that fuel pump 1.2 is not in-use, the pump information for fuel pump 1.A may indicate that fuel pump 1.A is not in-use, the pump information for fuel pump N.1 may indicate that fuel pump N.1 is not in-use, the pump information for fuel pump N.2 may indicate that fuel pump N.2 is out-of-service, and the pump information for fuel pump N.B may indicate that fuel pump N.B is in-use. For the purposes of example implementation 100, assume that the pump information, associated with each fuel pump, also includes information that identifies a fuel station at which the fuel pump is located (e.g., fuel station 1, fuel station N, etc.), location information associated with the fuel station (e.g., information that identifies location X, information that identifies location Y, etc.), an identifier of the fuel pump (e.g., fuel pump 1.1, fuel pump N.2, etc.), and price information associated with fuel dispensed by the fuel pump (e.g., $2.70/liter for fuel pumps at fuel station 1, $2.50/liter for fuel pumps at fuel station N, etc.).

As further shown, the server device may receive the pump information, and may store the pump information associated with each fuel pump. In some implementations, a pump device may provide updated pump information when, for example, the pump device determines that a fuel pump is no longer in-use, starts being used, returns to service, is associated with a price change, or the like.

As shown in FIG. 1B, a user device may receive (e.g., based on user input, based on information provided by a vehicle associated with the user device, etc.) an indication to identify an available fuel pump. For example, a user may provide, via a user interface of the user device, an indication that the user wishes to purchase fuel (e.g., when the vehicle is running low on fuel). As further shown, based on receiving the indication, the user device may provide, to the server device, a request to identify an available fuel pump. As shown, the request may include location information that identifies a location of the user device, such as an address, a set of global positioning system coordinates, or the like.

As further shown, the user device may also provide (e.g., with the request, at another time, etc.) selection parameters associated with identifying the available fuel pump. The selection parameters may include criteria based on which one or more fuel pumps may be identified as available. For example, the selection parameters may include a price parameter, such as an indication to identify a lowest priced fuel, a fuel price threshold, a fuel price range, or the like. As another example, the selection parameters may include a location parameter, such as an indication to identify a fuel pump based on a location of the fuel pump relative to a location of the user device, a distance threshold, a distance range, or the like. As an additional example, the selection parameters may include a fuel station parameter, such as a parameter that identifies a threshold quantity of fuel pumps for a fuel station to be identified as having an available fuel pump, a parameter that identifies a threshold quantity of available fuel pumps for the fuel station to be identified as having an available fuel pump, a parameter indicating that only fuel stations with active promotions should be identified as having available fuel pumps, or the like. As other examples, the selection parameters may including a fuel parameter, such as a parameter that identifies a fuel brand, a fuel characteristic, a fuel type, or the like.

As shown in FIG. 1B, the server device may receive the request (including the location information and the selection parameters) and may determine the pump information associated with the set of fuel pumps (e.g., stored by the server device as described above). As further shown, the server device may identify one or more available fuel pumps based on the location information, the selection parameters, and the pump information.

For example, as shown, the selection parameters may indicate that that the server device is to identify an available fuel pump as a pump that is closest to the user device with a fuel price that is less than $2.60 per liter. As shown, the server device may determine, based on the location information associated with the user device and the pump information associated with the fuel pumps that the user device is closest to fuel station 1 (e.g., that the user device is one kilometer from location X associated with fuel pumps 1.2 and 1.A). However, as shown, the user device may determine, based on the pump information associated with fuel pumps 1.2 and 1.A (e.g., indicating that the fuel price at pumps 1.2 and 1.A is $2.70 per liter) and the fuel price selection parameter, that fuel pumps 1.2 and 1.A may not be identified as available (e.g., since $2.70/liter>$2.60/liter).

As further shown, the server device may determine, based on the location information associated with the user device and the pump information associated with the fuel pumps that a next closest fuel station is fuel station N (e.g., that the user device is two kilometers from location Y associated with fuel pumps 1.2 and 1.A). Here, as shown, the user device may determine, based on the pump information associated with fuel pump N.1 (e.g., indicating that the fuel price at fuel pump N.1 is $2.50 per liter) and the fuel price selection parameter, that fuel pump N.1 may be identified as available (e.g., since $2.50/liter<$2.60/liter).

As shown in FIG. 1C, based on identifying the available fuel pump in accordance with the selection parameters, the server device may provide, to the user device, information associated with the available fuel pump. For example, as shown, the information associated with the available fuel pump may include information that identifies fuel pump N.1, the price information associated with fuel pump N.1, information that identifies fuel station N, location information associated with fuel station N, or the like. As further shown, in some implementations, the information associated with the available fuel pump may include navigation information associated with the available fuel pump, such as a map, a set of directions, or the like. As shown, the user device may provide, for display, the information associated with the available fuel pump for access by the user (e.g., such that the user may view the information and proceed to the available fuel pump).

In this way, a server device may identify one or more available fuel pumps, and provide information associated with the one or more available fuel pumps (e.g., for access by a user). In some implementations, the server device may identify the one or more available fuel pumps based on selection parameters, associated with a user device and/or a user of the user device, such that the user may customize the manner in which the one or more available fuel pumps are identified.

Figure 2:
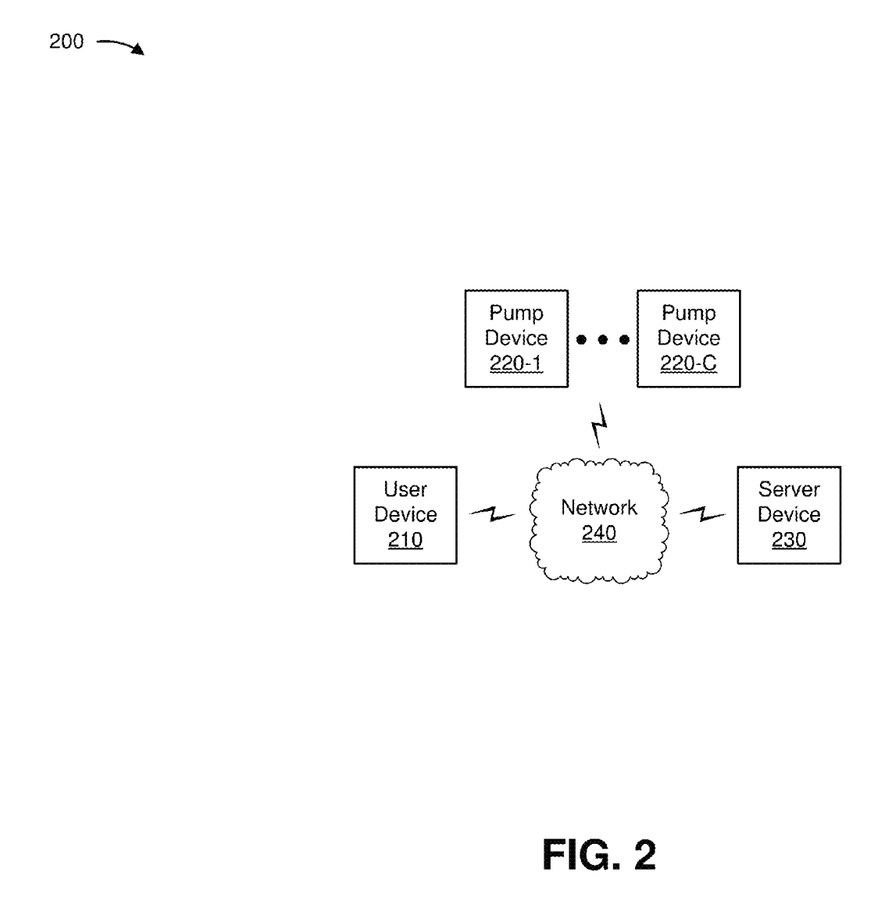
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more pump devices 220-1 through 220-C (C≥1) (hereinafter referred to collectively as pump devices 220, and individually as pump device 220), a server device 230, and a network 240. Devices of environment 200 may interconnect via wired connections, wireless connections, or a combination of wired and wireless connections.

User device 210 may include one or more devices capable of receiving, generating, storing, processing, and/or providing information associated with a fuel pump availability application. For example, user device 210 may include a communication and computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), a vehicle computer, or a similar type of device. As another example, user device 210 may include a vehicle computer associated with a vehicle.

Pump device 220 may include a device capable of determining and providing pump information associated with a fuel pump. For example, pump device 220 may include a user device, such as a mobile phone, a laptop computer, a tablet computer, a handheld computer, a wearable communication device (e.g., a smart wristwatch, a pair of smart eyeglasses, etc.) As another example, pump device 220 may include a machine-to-machine (M2M) device, such as a sensing device (e.g., a proximity sensor, a weight sensor, a heat sensor, etc.), a metering device, a camera, and/or any other smart device. In other words, in some implementations, pump device 220 may be any "thing" in the Internet of Things (IoT). As another example, pump device 220 may include a server or a group of servers. In some implementations, pump device 220 may be associated with one or more fuel pumps associated with a fuel station.

Server device 230 may include one or more devices capable of identifying one or more available fuel pumps based on selection parameters associated with user device 210 and/or pump information associated with a set of pump devices 220. For example, server device 230 may include a server or a group of servers.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
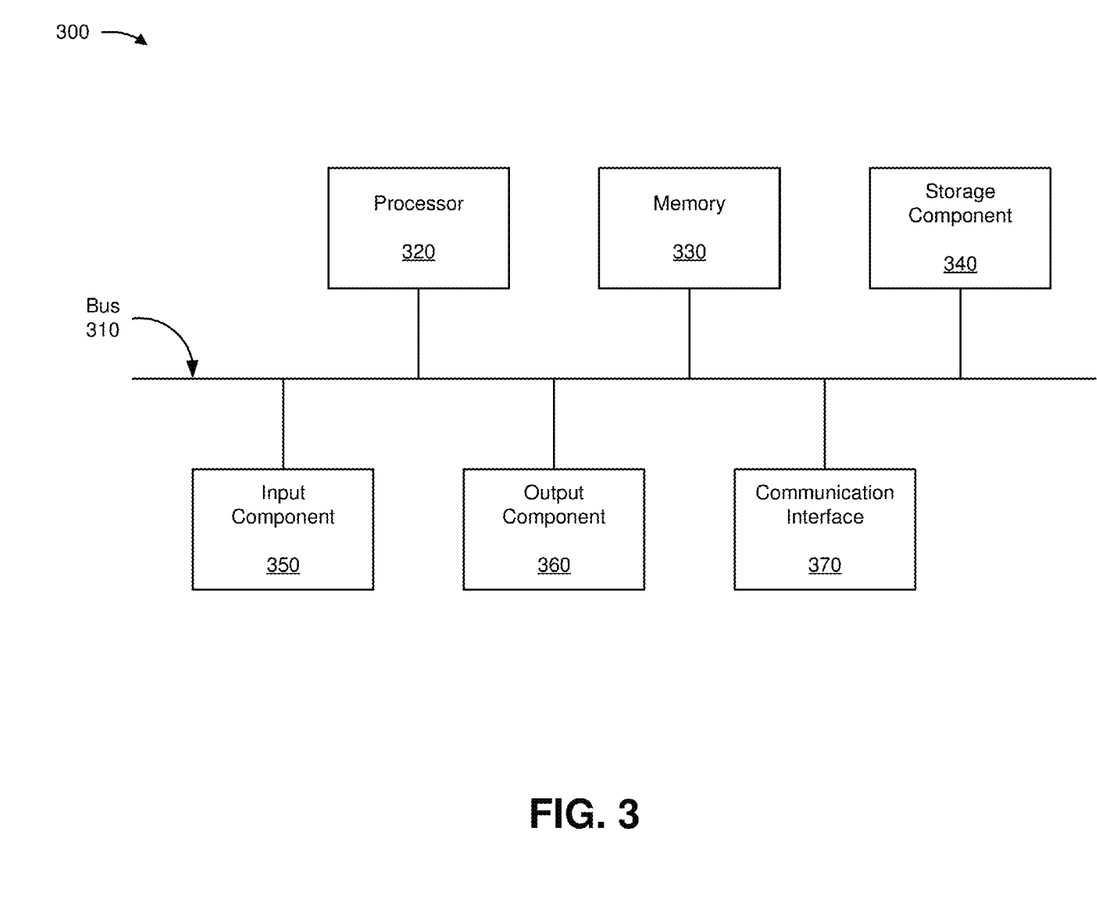
FIG. 3 is a diagram of example components of one or more devices of FIG. 2.

FIG. 3 is a diagram of example components of a device 300. Device 300 may correspond to user device 210, pump device 220, and/or server device 230. In some implementations, user device 210, pump device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
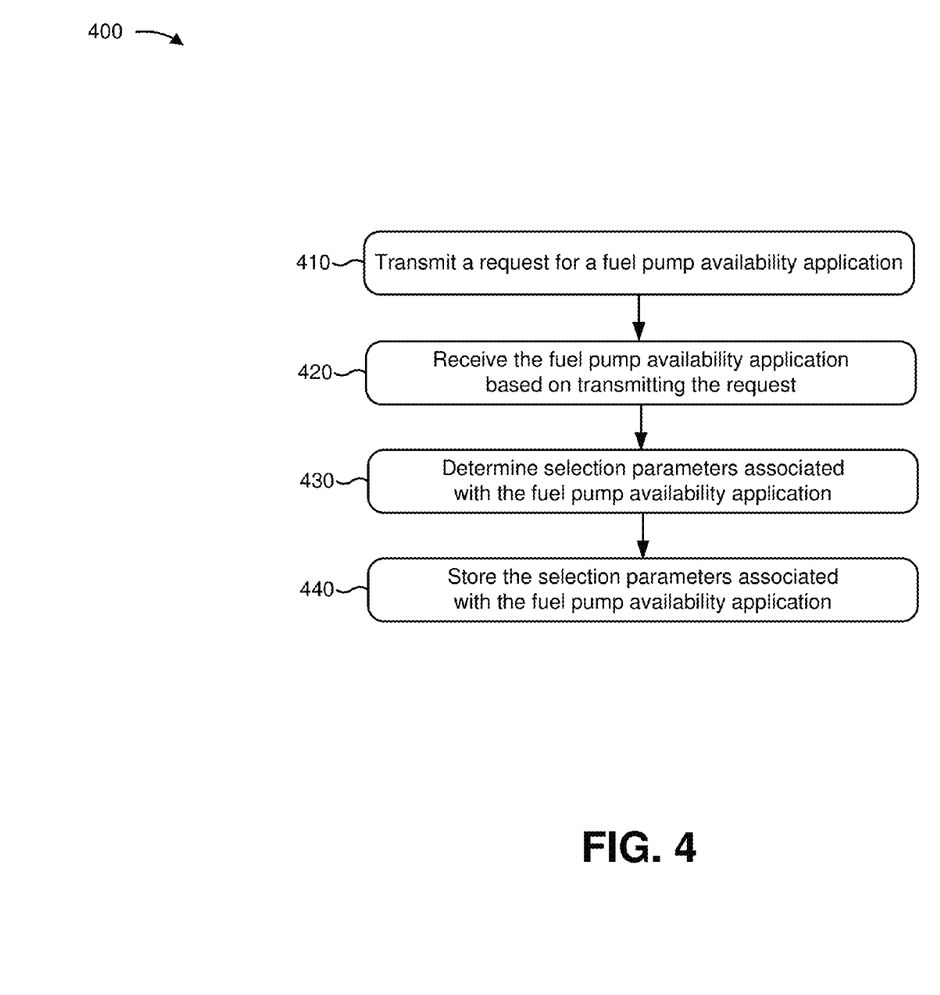
FIG. 4 is a flow chart of an example process for determining selection parameters associated with a fuel pump availability application.

FIG. 4 is a flow chart of an example process 400 for determining selection parameters associated with a fuel pump availability application. In some implementations, one or more process blocks of FIG. 4 may be performed by user device 210. In some implementations, one or more process blocks of FIG. 4 may be performed by another device or a group of devices separate from or including user device 210, such as server device 230.

As shown in FIG. 4, process 400 may include transmitting a request for a fuel pump availability application (block 410). For example, user device 210 may transmit the request for the fuel pump availability application to server device 230 via network 240. In some implementations, user device 210 may transmit the request, via network 240, to server device 230 associated with an application store. For example, user device 210 may request information identifying one or more available applications and server device 230 may provide information indicating that the fuel pump availability application is available from the application store. In this case, user device 210 may request the fuel pump availability application based on determining that the fuel pump availability application is available. In some implementations, the fuel pump availability application may be provided with user device 210 without a download from an application store.

In some implementations, user device 210 may provide purchase information associated with purchasing the fuel pump availability application when transmitting the request. For example, user device 210 may include, in the request, information identifying a password, a credit card number, an address, or the like. Additionally, or alternatively, user device 210 may provide identification information associated with user device 210, such as location information, a username, a device identifier, an Internet protocol (IP) address, or the like.

A fuel pump availability application may refer to an application that allows user device 210 to receive information associated with one or more available fuel pumps (e.g., such that the user may travel to one of the one or more available fuel pumps in order to purchase fuel).

As further shown in FIG. 4, process 400 may include receiving the fuel pump availability application based on transmitting the request (block 420). For example, user device 210 may receive the fuel pump availability application based on transmitting the request for the fuel pump availability application to a server device of network 240. In some implementations, user device 210 may download the application from server device 230 via network 240.

Additionally, or alternatively, user device 210 may receive authorization to use the fuel pump availability application when receiving the fuel pump availability application. For example, user device 210 may receive, from an application store of network 240, a password, an installation key, an activation key, or the like, with which to use the fuel pump availability application based on transmitting the request for the fuel pump availability application. In some implementations, user device 210 may obtain the fuel pump availability application from a data structure in which the fuel pump availability application is stored, such as a data structure of user device 210, a remote data structure associated with network 240, or the like.

As further shown in FIG. 4, process 400 may include determining selection parameters associated with the fuel pump availability application (block 430). For example, user device 210 may determine selection parameters associated with the fuel pump availability application. In some implementations, user device 210 may determine the selection parameters after user device 210 receives the fuel pump availability application.

The selection parameters may include criteria used to identify one or more available fuel pumps. For example, the selection parameters may include a price parameter, such as an indication to identify a lowest priced fuel, a fuel price threshold (e.g., a maximum price, a minimum price, etc.), a fuel price range (e.g., a fuel price from $2.00 to $3.00), or the like.

As another example, the selection parameters may include a location parameter, such as an indication to identify one or more closest fuel pumps (e.g., a closest fuel pump not in-use, a closest three fuel pumps not in-use, etc.), a distance threshold (e.g., a maximum distance from user device 210, a maximum distance from a highway, etc.), a distance range (e.g., a not in-use fuel pump between zero and five kilometers, etc.), or the like.

As an additional example, the selection parameters may include a fuel station parameter, such a parameter that identifies a threshold quantity of fuel pumps for a fuel station to be identified as having an available fuel pump (e.g., a minimum quantity of fuel pumps, a maximum quantity of fuel pumps, etc.), a parameter that identifies a threshold quantity of available fuel pumps for the fuel station to be identified as having an available fuel pump (e.g., a minimum quantity of available fuel pumps, a maximum quantity of available fuel pumps, etc.), a parameter indicating that only fuel stations with available promotions should be identified as having available fuel pumps (e.g., a 10% discount on a fuel purchase, a discounted car wash with a fuel purchase, a free coffee with a fuel purchase, etc.), or the like.

As other examples, the selection parameters may including a fuel parameter, such as a parameter that identifies a fuel brand (e.g., Shell, Gulf, Valero, etc.), a fuel characteristic (e.g., 86 octane, 92 octane, regular, premium, super, 10% ethanol, etc.), a fuel type (e.g., gas, diesel, kerosene, etc.), or the like. In some implementations, the selection parameters may include one or more other types of criteria.

In some implementations, the selection parameters may include a priority and/or a weight. For example, a first selection parameter (e.g., an indication to identify a lowest priced fuel) may have a first priority (e.g., high, level 1, etc.), while a second selection parameter (e.g., a fuel characteristic) may have a second (e.g., low, level 3, etc.) priority. In some implementations, server device 230 may identify one or more available fuel pumps based on the selection parameters and the corresponding priorities and/or weights, as described below.

In some implementations, user device 210 may receive the selection parameters based on user input. For example, user device 210 may execute the fuel pump availability application, and may provide, for display to a user, a user interface that allows the user to provide input associated with the selection parameters. As an example, the user interface may allow the user to provide (e.g., via text boxes, drop-down menus, buttons, menus, etc.) the selection parameters and/or the corresponding priorities and/or weights. Here, user device 210 may determine the selection parameters based on input provided via the user interface.

Additionally, or alternatively, user device 210 may receive the selection parameters based on information provided by another device. For example, user device 210 may receive (e.g., during download of the fuel pump availability application, before the user inputs the selection parameters, etc.) default selection parameters from server device 230.

As further shown in FIG. 4, process 400 may include storing the selection parameters associated with the fuel pump availability application (block 440). For example, user device 210 may store the selection parameters. In some implementations, user device 210 may store the selection parameters after user device 210 receives the selection parameters. Additionally, or alternatively, user device 210 may store the selection parameters when user device 210 receives information indicating that user device 210 is to store the selection parameters from another device.

In some implementations, user device 210 may store the selection parameters in a memory location (e.g., a RAM, a ROM, a cache, a hard disk, etc.) of user device 210. In some implementations, user device 210 may store information associated with the selection parameters such that previous selection parameters (e.g., selection parameters received by user device 210 at an earlier time) are supplemented, modified, overwritten, deleted, or the like.

Additionally, or alternatively, user device 210 may provide the selection parameters to another device for storage. For example, user device 210 may provide the selection parameters for storage by server device 230. In some implementations, user device 210 may also provide information that identifies user device 210 (e.g., a device identifier, a phone number, a network address, etc.) and/or information that identifies the user of user device 210 (e.g., a username, a first and last name, an account number, etc.) along with the selection parameters. This may allow server device 230 to determine the selection parameters, associated with user device 210 or the user, at a later time (e.g., based on the information that identifies user device 210 or the user), as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
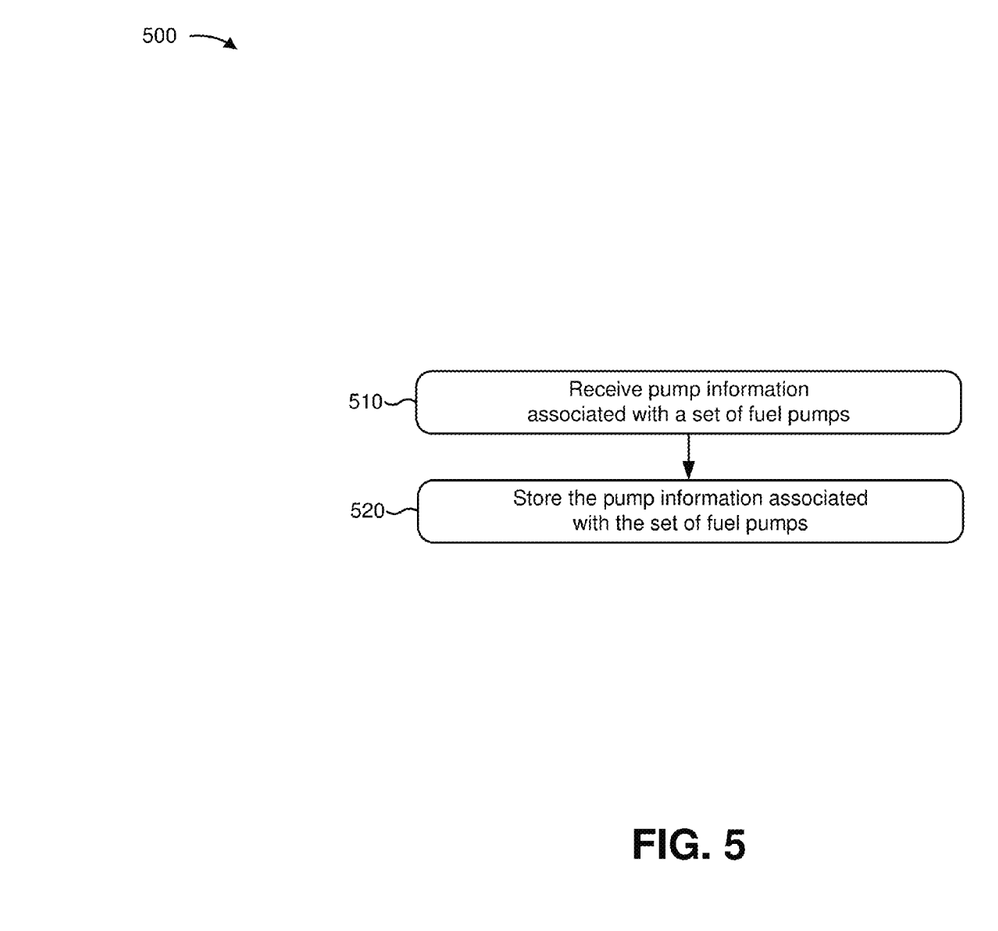
FIG. 5 is a flow chart of an example process for receiving and storing pump information associated with a set of fuel pumps.

FIG. 5 is a flow chart of an example process 500 for receiving and storing pump information associated with a set of fuel pumps. In some implementations, one or more process blocks of FIG. 5 may be performed by server device 230. In some implementations, one or more process blocks of FIG. 5 may be performed by another device or a group of devices separate from or including server device 230, such as user device 210.

As shown in FIG. 5, process 500 may include receiving pump information associated with a set of fuel pumps (block 510). For example, server device 230 may receive pump information associated with a set of fuel pumps. In some implementations, server device 230 may receive the pump information when a set of other devices provides the pump information, such as a set of pump devices 220.

The pump information may include information indicating whether a fuel pump is in-use, not in-use, out-of-service, in service, or the like. In some implementations, server device 230 may receive the pump information from pump device 220 associated with the fuel pump. For example, pump device 220 may be a sensing device installed at or near the fuel pump, such as a proximity sensor (e.g., to detect whether a fuel dispenser is on or off of the fuel pump), a weight sensor (e.g., to detect whether a vehicle is stopped near the fuel pump), or the like. Here, pump device 220 may sense when the fuel pump is in-use (e.g., when the fuel dispenser is off of the fuel pump, when a vehicle is stopped near the fuel pump, etc.) and may (e.g., automatically) provide first pump information to server device 230 indicating that the fuel pump is in-use. Continuing with this example, pump device 220 may sense when the fuel pump is not in-use (e.g., when the fuel dispenser is placed back on the fuel pump, when the vehicle is moved from the fuel pump, etc.), and may provide second pump information to server device 230 indicating that the fuel pump is not-in use.

As another example, pump device 220 may be a camera installed at or near the fuel pump. Here, pump device 220 may capture a first image of an area associated with the fuel pump, may determine (e.g., based on analyzing the first image) that a vehicle is stopped at the fuel pump, and may (e.g., automatically) provide first pump information to server device 230 indicating that the fuel pump is in-use. Continuing with this example, pump device 220 may capture a second image of the area associated with the fuel pump, may determine (e.g., based on analyzing the second image) that the vehicle has moved from the fuel pump, and may provide second pump information to server device 230 indicating that the fuel pump is not in-use.

As yet another example, pump device 220 may be a user device associated with an employee of the fuel station (e.g., a pump attendant, a cashier, etc.). In this example, the employee of the fuel station may provide the pump information as input to the user device. As a particular example, the employee may provide, to the user device, first pump information (e.g., first user input) indicating that the fuel pump is in-use (e.g., when the pump attendant begins filling a vehicle using the fuel pump, when the cashier sees that the fuel pump is in-use, etc.), and the user device may provide the pump information to server device 230. Continuing with the example, the employee may provide, to the user device, second pump information (e.g., second user input) indicating that the pump is not in-use (e.g., when the pump attendant finishes filling the vehicle using the fuel pump, when the cashier sees that the fuel pump is not in-use, etc.), and the user device may provide the pump information to server device 230.

In some implementations, as described in the above examples, server device 230 may receive the pump information from pump device 220 based on a change in usage of the fuel pump. Additionally, or alternatively, server device 230 may receive the pump information from pump device 220 at particular intervals of time (e.g., every one minute, every five minutes) as configured on pump device 220, in response to a request provided by server device 230 (e.g., when server device 230 sends a request for pump information to pump device 220), or the like.

In some implementations, the pump information may include information associated with the fuel pump. For example, the pump information may include information that identifies the fuel pump (e.g., a pump identification number, a pump name, etc.), a price of the fuel dispensed at the fuel pump, a type of fuel dispensed at the fuel pump, or the like.

Additionally, or alternatively, the pump information may include information associated with the fuel station. For example, the pump information may include information that identifies the fuel station (e.g., a fuel station identification number, a fuel station name, etc.), information that identifies a location of the fuel station (e.g., an address, a set of global positioning system (GPS) coordinates, etc.), information that identifies a brand of the fuel associated with the fuel station, information associated with one or more promotions associated with the fuel station, or the like.

As further shown in FIG. 5, process 500 may include storing the pump information associated with the set of fuel pumps (block 520). For example, server device 230 may store the pump information. In some implementations, server device 230 may store the pump information after server device 230 receives the pump information. Additionally, or alternatively, server device 230 may store the pump information when server device 230 receives, from another device, information indicating that server device 230 is to store the pump information.

In some implementations, server device 230 may store the pump information in a memory location (e.g., a RAM, a ROM, a cache, a hard disk, etc.) of server device 230. In some implementations, server device 230 may store information associated with the pump information such that previous pump information (e.g., pump information received by server device 230 at an earlier time) is supplemented, modified, overwritten, deleted, or the like.

In some implementations, server device 230 may store the pump information associated with the fuel pump and/or the fuel station such that server device 230 may determine the pump information, associated with the fuel pump and/or the fuel station, at a later time.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
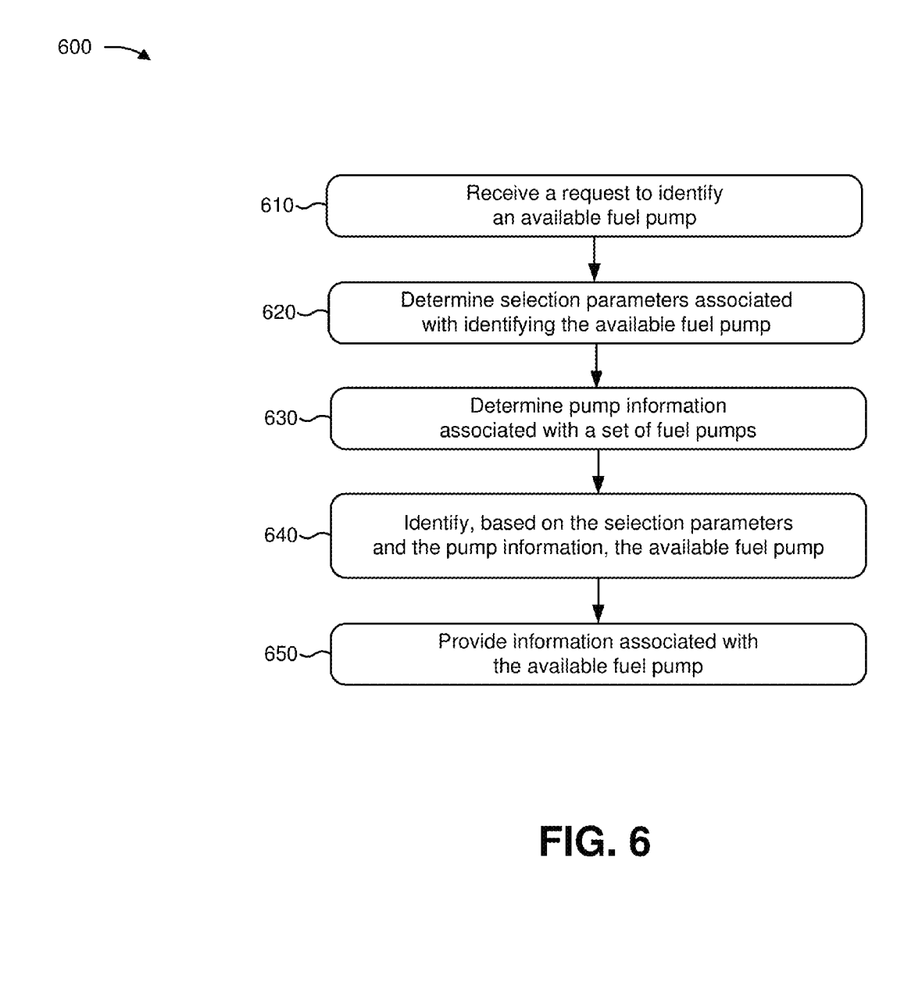
FIG. 6 is a flow chart of an example process for identifying an available fuel pump and providing information associated with the available fuel pump.

FIG. 6 is a flow chart of an example process 600 for identifying an available fuel pump and providing information associated with the available fuel pumps. In some implementations, one or more process blocks of FIG. 6 may be performed by server device 230. In some implementations, one or more process blocks of FIG. 6 may be performed by another device or a group of devices separate from or including server device 230, such as user device 210.

As shown in FIG. 6, process 600 may include receiving a request to identify an available fuel pump (block 610). For example, server device 230 may receive the request to identify the available fuel pump. In some implementations, server device 230 may receive the request when another device provides the request, such as user device 210.

In some implementations, the request may include an indication to identify one or more available fuel pumps. Additionally, or alternatively, the request may include information that identifies user device 210 and/or information that identifies the user of user device 210. Additionally, or alternatively, the request may include the selection parameters associated with user device 210.

Additionally, or alternatively, the request may include information that identifies a location associated with the request. For example, user device 210 may provide a request that includes information that identifies an address at which user device 210 is located, a set of GPS coordinates that identify a location of user device 210, or the like. In some implementations, user device 210 may automatically determine and provide the information that identifies the location, or may determine the information that identifies the location based on user input.

In some implementations, server device 230 may receive the request based on user input associated with user device 210. For example, the user (e.g., a driver of a vehicle) may provide, via a user interface of the fuel pump availability application, user input associated with identifying an available fuel pump (e.g., when the user determines that the vehicle needs refueling). Here, user device 210 may provide, based on the user input, the request to server device 230.

Additionally, or alternatively, server device 230 may automatically receive the request. For example, a vehicle computer may be capable of communicating with user device 210 (e.g., via a Bluetooth connection, via a Wi-Fi connection, via a near-field communication (NFC) connection, etc.). Here, the vehicle computer may determine that the vehicle is running out of fuel, and may provide an indication to user device 210. User device 210 may receive the indication from the vehicle computer, and may automatically provide the request to server device 230. As another example, server device 230 may receive the request based on a configuration of server device 230. For example, server device 230 may be configured to predict (e.g., based on previous requests and/or other information associated with user device 210 or the user), when the user may need to purchase fuel. In this example, server device 230 may, upon predicting that the user may need to purchase fuel, automatically receive the request (i.e., without user intervention)

As further shown in FIG. 6, process 600 may include determining selection parameters associated with identifying the available fuel pump (block 620). For example, server device 230 may determine selection parameters associated with identifying the available fuel pump. In some implementations, server device 230 may determine the selection parameters when server device 230 receives the request to identify available fuel pump.

In some implementations, server device 230 may determine the selection parameters based on receiving the selection parameters from user device 210. For example, user device 210 may provide the selection parameters (e.g., stored or accessible by user device 210) when user device 210 provides the request to identify the available fuel pump. Here, server device 230 may determine the selection parameters based on receiving the selection parameters from user device 210.

Additionally, or alternatively, server device 230 may determine the selection parameters based on information that identifies user device 210 and/or a user of user device 210 and stored or accessible selection parameters. For example, as described above, server device 230 may store selection parameters provided by user device 210. In this example, server device 230 may receive (e.g., with the request), information that identifies user device 210 (e.g., a device identifier, a phone number, a network address, etc.) and/or information that identifies the user of user device 210 (e.g., a username, a first and last name, an account number, etc.). As described above, the selection parameters stored by server device 230 may include corresponding information that identifies user device 210 or the user of user device 210. Server device 230 may receive the request, including the information that identifies user device 210 or the user, and may perform a lookup in order to determine the selection parameters corresponding to user device 210 and/or the user.

As further shown in FIG. 6, process 600 may include determining pump information associated with a set of fuel pumps (block 630). For example, server device 230 may determine, pump information associated with a set of fuel pumps. In some implementations, server device 230 may determine the pump information after server device 230 receives the request to identify the available fuel pump.

In some implementations, server device 230 may determine the pump information based on pump information stored or accessible by server device 230. For example, as described above, server device 230 may receive, from a set of pump devices 220, pump information associated with a set of fuel pumps, and may store the pump information. Here, server device 230 may receive the request to identify an available fuel pump, and may analyze the pump information in storage.

As further shown in FIG. 6, process 600 may include identifying, based on the selection parameters and the pump information, the available fuel pump (block 640). For example, server device 230 may identify, based on the selection parameters and the pump information, the available fuel pump as a fuel pump in the set of fuel pumps. In some implementations, server device 230 may identify the available fuel pump when server device 230 receives the request to identify the available fuel pump. Additionally, or alternatively, server device 230 may identify the available fuel pump when server device 230 determines the selection parameters and/or the pump information.

In some implementations, server device 230 may identify the available fuel pump based on the selection parameters and the pump information. For example, assume that the selection parameters, associated with user device 210, indicate that the user wishes to be provided with information associated with three not in-use fuel pumps with a maximum cost of $2.50 per liter of fuel. Here, server device 230 may determine, based on the request, a location of user device 210. In this example, server device 230 may identify, based on the location of user device 210 and the pump information (e.g., information indicating whether each fuel pump is in-use, location information associated with each fuel pump, fuel price information associated with each full pump) the three fuel pumps closest to user device 210 with a cost that is less than or equal to $2.50 per liter as available fuel pumps. In some implementations, server device 230 may identify one or more available fuel pumps.

In some implementations, server device 230 may identify the available fuel pumps based on a pump identification algorithm stored or accessible by server device 230. For example, server device 230 may store or have access to a pump identification algorithm configured to receive, as input, the selection parameters and the location of user device 210, and provide, as output, information associated with the available fuel pump (e.g., a fuel pump that satisfies the selection parameters and is not in-use). Here, the pump identification algorithm may use the pump information to identify the available fuel pump.

Additionally, or alternatively, server device 230 may identify available fuel pump based on generating an availability score associated with the set of fuel pumps. For example, server device 230 may combine one or more items of pump information associated with each fuel pump (e.g., a fuel price, a distance from user device 210, a fuel brand, etc.), and may generate an availability score (e.g., a value from 0 to 1, etc.) for each fuel pump based on the combined items of pump information and the selection parameters. Here, server device 230 may identify the available fuel pump based on the generated availability scores (e.g., a fuel pump with a highest availability score, a fuel pump with an availability that satisfies a threshold, etc.).

As another example, server device 230 may server device 230 may generate, using the selection parameters, one or more scores corresponding to one or more items of pump information, associated with a fuel pump, and combine (e.g., a weighted combination) the one or more scores to generate an overall availability score associated with the fuel pump.

Additionally, or alternatively, server device 230 may identify the available fuel pump based on priority information associated with the set of fuel pumps. For example, server device 230 may store or have access to priority information associated with the set of fuel pumps that indicates that a first fuel pump has a higher priority (e.g., level 1, gold, etc.) than a second fuel pump (e.g., level 2, silver, etc.). Here, even if server device 230 determines that both the first fuel pump and the second fuel pump are not in-use, then server device 230 may identify the first fuel pump as being available (e.g., rather than the second fuel pump) based on the priority information. In some implementations, the priority information may correspond to a level of service purchased by an owner of the fuel pump (e.g., where the owner may purchase a gold level of service for the owner's fuel pumps in order to cause the owner's fuel pumps to be given a higher priority than other fuel pumps).

As further shown in FIG. 6, process 600 may include providing information associated with the available fuel pump (block 650). For example, server device 230 may provide information associated with the available fuel pump. In some implementations, server device 230 may provide the information associated with available fuel pump after server device 230 identifies the available fuel pump.

In some implementations, the information associated with the available fuel pump may include one or more items of pump information associated with the available fuel pump. For example, the information associated with the available fuel pump may include location information associated with the available fuel pump (e.g., a set of GPS coordinates, an address, etc.), information that identifies the available fuel pump (e.g., a pump identification number, a pump name, etc.), a price of the fuel dispensed at the available fuel pump, a name of a fuel station at which the available fuel pump is located, distance information associated with the available fuel pump (e.g., a distance from user device 210 to the available fuel pump), or the like.

Additionally, or alternatively, the information associated with the available fuel pump may include navigation information associated with the available fuel pump. For example, the information associated with the available fuel pump may include driving directions to the available fuel pump. As another example, the information associated with the available fuel pump may include a map that identifies a location of the available fuel pump. Here, the map may also include information that identifies a location of user device 210.

Additionally, or alternatively, the information associated with the available fuel pump may include promotion information. For example, in some implementations, the promotion information may be included in the pump information stored or accessible by server device 230, as described above. In some implementations, server device 230 may select an item of promotion information (e.g., a particular promotion) to be provided to user device 210. For example, server device 230 may randomly select a promotion of a group of promotions, may select a next promotion in a sequence of promotions (e.g., when previous promotions in the sequence have already been provided to user device 210 and/or other user devices 210, etc.), may select a particular promotion based on information associated with user device 210 (e.g., profile information associated with the user, demographic information associated with the user, etc.), based on the selection parameters associated with user device 210 (e.g., when the selection parameters identify types of promotions to be provided to user device 210), or the like.

In some implementations, user device 210 may receive the information associated with the available fuel pump, and may provide the information associated with the available fuel pump for display. For example, user device 210 may provide, for display, the map that identifies a location of the available fuel pump. Here, user device 210 may provide further information associated with the available fuel pump when user device 210 receives user input associated with the available fuel pump. For example, when the user selects the available fuel pump via a touch screen of user device 210, user device 210 may display other information associated with the available fuel pump (e.g., driving directions, an address, fuel price information, promotion information, etc.). In some implementations, user device 210 may concurrently display information associated with multiple available fuel pumps (e.g., when server device 230 identifies multiple available fuel pumps).

In some implementations, server device 230 may provide updated information associated with the available fuel pump (e.g., in real-time, in near real-time, etc.) as the user moves towards the fuel pump. As such, the user may be provided with updated information associated with the fuel pump, such as information indicating that the fuel pump is no longer available, a prediction of when the fuel pump may again become available (e.g., in the event that someone else arrives at the fuel pump before the user, server device 230 may predict when the fuel pump will be available again), or the like.

Additionally, or alternatively, server device 230 may provide information associated with reserving the available fuel pump. For example, server device 230 may provide, to user device 210, a user interface that includes information associated with allowing the user to reserve the fuel pump for a period of time, such as two minutes, five minutes, or the like (e.g., so that others may not use the fuel pump while the user is in transit to the fuel pump). In this example, user device 210 may provide, to server device 230 (e.g., based on user input), an indication that the user wishes to reserve the fuel pump. Server device 230 may communicate with pump device 220, associated with the fuel pump, in order to "lock" the fuel pump and determine unlocking information (e.g., a password, an activation code, etc.) that allows the user to "unlock" the fuel pump upon arrival. Server device 230 may then provide the activation code to user device 210 (e.g., such that the user may enter the activation code via pump device 220 in order to unlock the fuel pump).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations may allow a server device to identify an available fuel pump and provide information associated with the available fuel pump (e.g., for viewing by a user). In some implementations, the server device may identify the available fuel pump based on selection parameters, associated with a user device and/or a user, such that the user may customize the manner in which the available fuel pump is identified.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain-user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, a request to identify an available fuel pump;
determining, by the device, selection parameters associated with identifying an available fuel pump,
the selection parameters including criteria used to identify whether a fuel station has an available fuel pump, and
the selection parameters including:
a first parameter that identifies the fuel station as having an available fuel pump when the fuel station satisfies a threshold quantity of available fuel pumps,
a second parameter that identifies the fuel station as having an available fuel pump when the fuel station satisfies a fuel price threshold,
a third parameter that identifies the fuel station as having an available fuel pump when the fuel station satisfies a distance threshold,
a fourth parameter that identifies the fuel station as having an available fuel pump when the fuel station provides a particular type of fuel, and
a fifth parameter that identifies the fuel station as having an available fuel pump when the fuel station provides a promotion based on a fuel purchase;
determining, by the device, pump information associated with a set of fuel pumps,
the pump information including information indicating whether each fuel pump, of the set of fuel pumps, is available;
identifying, by the device and based on the selection parameters and the pump information, a fuel pump, of the set of fuel pumps, as the available fuel pump; and
providing, by the device, navigation information associated with the fuel pump identified as the available fuel pump.

2. The method of claim 1, where identifying the fuel pump as the available fuel pump comprises:
determining, based on the pump information, that the fuel pump is not in-use or out-of-service; and
identifying the fuel pump as the available fuel pump based on determining that the fuel pump is not-in use or out-of-service.

3. The method of claim 1, further comprising:
receiving information that identifies a first location associated with the request; and
where identifying the fuel pump as the available fuel pump comprises:
determining a distance from the first location to a second location,
the second location being associated with the fuel pump and being identified in the pump information; and
identifying the fuel pump as the available fuel pump based on the distance from the first location to the second location.

4. The method of claim 1, where identifying the fuel pump as the available fuel pump comprises:
comparing the selection parameters and the pump information; and
identifying the fuel pump as the available fuel pump based on comparing the selection parameters and the pump information.

5. The method of claim 1, where determining the selection parameters associated with identifying the available fuel pump comprises:
receiving user input associated with the selection parameters.

6. The method of claim 1, where
the navigation information includes map information associated with the fuel pump or directions associated with the fuel pump.

7. The method of claim 1, where the pump information includes at least one of:
information that identifies the fuel pump;
price information that identifies a price of fuel dispensed at the fuel pump;
information that identifies a type of fuel dispensed at the fuel pump;
information that identifies the fuel station at which the fuel pump is located; or
information that identifies a location of the fuel station at which the fuel pump is located.

8. A device, comprising:
one or more processors to:
receive a request to identify one or more available fuel pumps;
determine selection parameters associated with identifying the one or more available fuel pumps,
the selection parameters including criteria used to identify whether a fuel station has an available fuel pump, and
the selection parameters including:
a first parameter that identifies the fuel station as having one or more available fuel pumps when the fuel station satisfies a threshold quantity of available fuel pumps,
a second parameter that identifies the fuel station as having one or more available fuel pumps when the fuel station satisfies a fuel price threshold,
a third parameter that identifies the fuel station as having one or more available fuel pumps when the fuel station satisfies a distance threshold,
a fourth parameter that identifies the fuel station as having one or more available fuel pumps when the fuel station provides a particular type of fuel, and
a fifth parameter that identifies the fuel station as having one or more available fuel pumps when the fuel station provides a promotion based on a fuel purchase;
receive pump information associated with a group of fuel pumps,
the pump information including information indicating whether each fuel pump, of the group of fuel pumps, is available;
identify, based on the selection parameters and the pump information, the one or more available fuel pumps from the group of fuel pumps; and
provide, for display, navigation information associated with the one or more available fuel pumps.

9. The device of claim 8, where the one or more processors, when identifying the one or more available fuel pumps, are to:

determine, based on the pump information, that one or more fuel pumps, of the group of fuel pumps, are not in-use or out-of-service; and identify the one or more fuel pumps as the one or more available fuel pumps based on determining the one or more fuel pumps are not-in use or out-of-service.

10. The device of claim 8, where the one or more processors are further to:

receive information that identifies a first location associated with the request; and where the one or more processors, when identifying the one or more available fuel pumps, are to:

determine one or more distances from the first location to one or more second locations corresponding to one or more fuel pumps of the group of fuel pumps, the one or more second locations being identified in the pump information; and identify the one or more fuel pumps as the one or more available fuel pumps based on the one or more distances.

11. The device of claim 8, where the one or more processors, when identifying the one or more available fuel pumps, are to:

compare the selection parameters and the pump information; and identify the one or more available fuel pumps based on comparing the selection parameters and the pump information.

12. The device of claim 8, where the one or more processors, when determining the selection parameters associated with identifying the one or more available fuel pumps, are to:

determine the selection parameters based on user input associated with a fuel pump availability application.

13. The device of claim 8, where the navigation information includes map information associated with the one or more available fuel pumps or directions associated with the one or more available fuel pumps.

14. The device of claim 8, where the pump information includes at least one of:

price information that identifies the fuel price threshold or a fuel price range;

location information that identifies the distance threshold or a distance range;

fuel station information that identifies the threshold quantity of available fuel pumps; or fuel information that identifies a fuel brand, the particular type of fuel, or a fuel characteristic.

15. A non-transitory computer-readable medium storing instructions, the instructions comprising:

one or more instructions that, when executed by one or more processors, cause the one or more processors to:

receive selection parameters associated with identifying an available fuel pump, the selection parameters including criteria used to identify whether a fuel station has an available fuel pump, the selection parameters including:

a first parameter that identifies the fuel station as having an available fuel pump when the fuel station satisfies a threshold quantity of available fuel pumps, a second parameter that identifies the fuel station as having an available fuel pump when the fuel station satisfies a fuel price threshold, a third parameter that identifies the fuel station as having an available fuel pump when the fuel station satisfies a distance threshold, a fourth parameter that identifies the fuel station as having an available fuel pump when the fuel station provides a particular type of fuel, and a fifth parameter that identifies the fuel station as having an available fuel pump when the fuel station provides a promotion based on a fuel purchase;

determine pump information associated with a group of fuel pumps, the pump information including information indicating whether each fuel pump, of the group of fuel pumps, is available;

identify, based on the selection parameters and the pump information, the available fuel pump from the group of fuel pumps; and provide, for display by a user device, navigation information associated with the available fuel pump.

16. The non-transitory computer-readable medium of claim 15, where the one or more instructions, that cause the one or more processors to identify the available fuel pump, cause the one or more processors to:

generate, based on the pump information and the selection parameters, an availability score associated with a particular fuel pump; and identify the particular fuel pump as the available fuel pump based on the availability score associated with the particular fuel pump.

17. The non-transitory computer-readable medium of claim 16, where the one or more instructions, that cause the one or more processors to generate the availability score, cause the one or more processors to:

apply one or more weights to one or more items of the pump information to generate one or more items of weighted pump information, the one or more weights being associated with the selection parameters; and generate the availability score based on a combination of the one or more items of weighted pump information.

18. The non-transitory computer-readable medium of claim 15, where the one or more instructions, that cause the one or more processors to identify the available fuel pump, cause the one or more processors to:

determine that a distance from a first location, associated with the user device, to a second location, corresponding to a fuel pump of the group of fuel pumps, satisfies the distance threshold, the second location being identified in the pump information; and identify the fuel pump as the available fuel pump based on determining that the distance satisfies the distance threshold.

19. The non-transitory computer-readable medium of claim 15, where the one or more instructions, that cause the one or more processors to identify the available fuel pump, cause the one or more processors to:

provide the selection parameters and the pump information as input to a pump identification algorithm; and receive, as output from the pump identification algorithm, information that identifies the available fuel pump from the group of fuel pumps.

20. The non-transitory computer-readable medium of claim 15, where the one or more instructions, that cause the one or more processors to identify the available fuel pump, cause the one or more processors to:

compare the selection parameters and the pump information; and identify the available fuel pump based on comparing the selection parameters and the pump information.

* * * * *